United States Patent [11] 3,587,763

[72] Inventor Alan Kinkead
 Los Altos Hills, Calif.
[21] Appl. No. 850,550
[22] Filed Aug. 15, 1969
[45] Patented June 28, 1971
[73] Assignee W. R. Ames Company
 Calif.

[54] IRRIGATING MACHINE
 16 Claims, 7 Drawing Figs.
[52] U.S. Cl. .................................................. 180/14,
 137/344
[51] Int. Cl. ..................................................... B60d 1/08,
 B62d 59/04
[50] Field of Search ............................................ 180/14;
 280/408; 239/147, 141, 176—180, 160,166,
 148,183; 137/344; 180/14 (A,B,C,D); 180/6.5;
 137/351, 352

[56] References Cited
 UNITED STATES PATENTS
2,711,615 6/1955 Boice, Jr. ........................ (180/6.5UX)
3,394,729 7/1968 Bower et al. .................. 137/344
Primary Examiner—Benjamin Hersh
Assistant Examiner—John P. Silverstrim
Attorney—Lothrop and West ABSTRACT: An irrigating machine includes a main unit and one or more auxiliary units all adapted to travel on the ground and propelled by individual motors, the elongated units being pivoted together at their adjacent ends for movement about a common axis usually vertical, sometimes horizontal and sometimes both. The pivotal movement between one unit and the adjacent unit is utilized to actuate a control mechanism so that selected drive motors are varied in speed or are turned off from time to time in order to maintain the desired alignment or relative pivoted position of the adjacent units with respect to each other.

PATENTED JUN28 1971
3,587,763
SHEET 1 OF 3
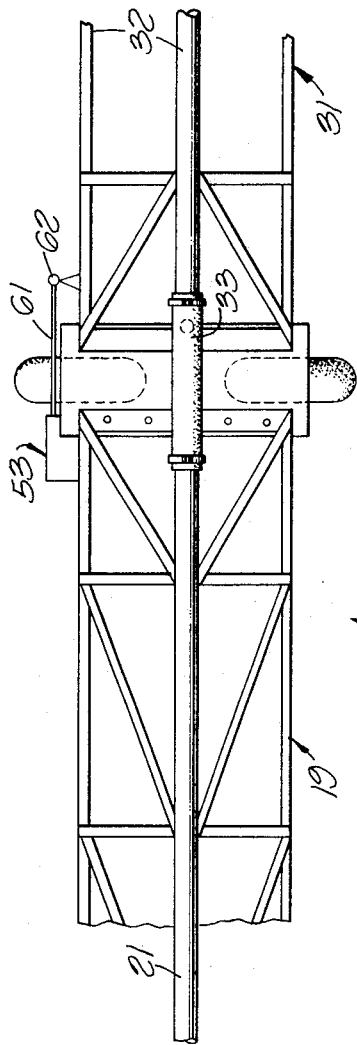
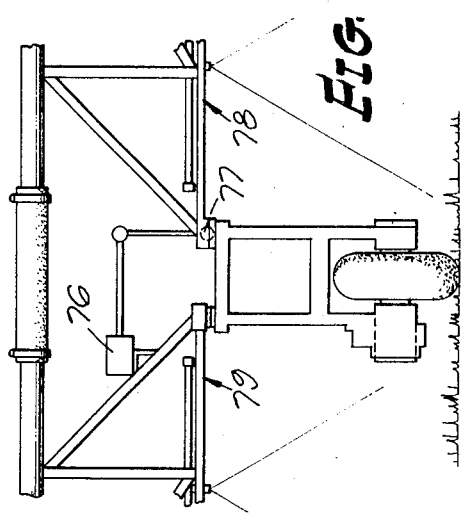
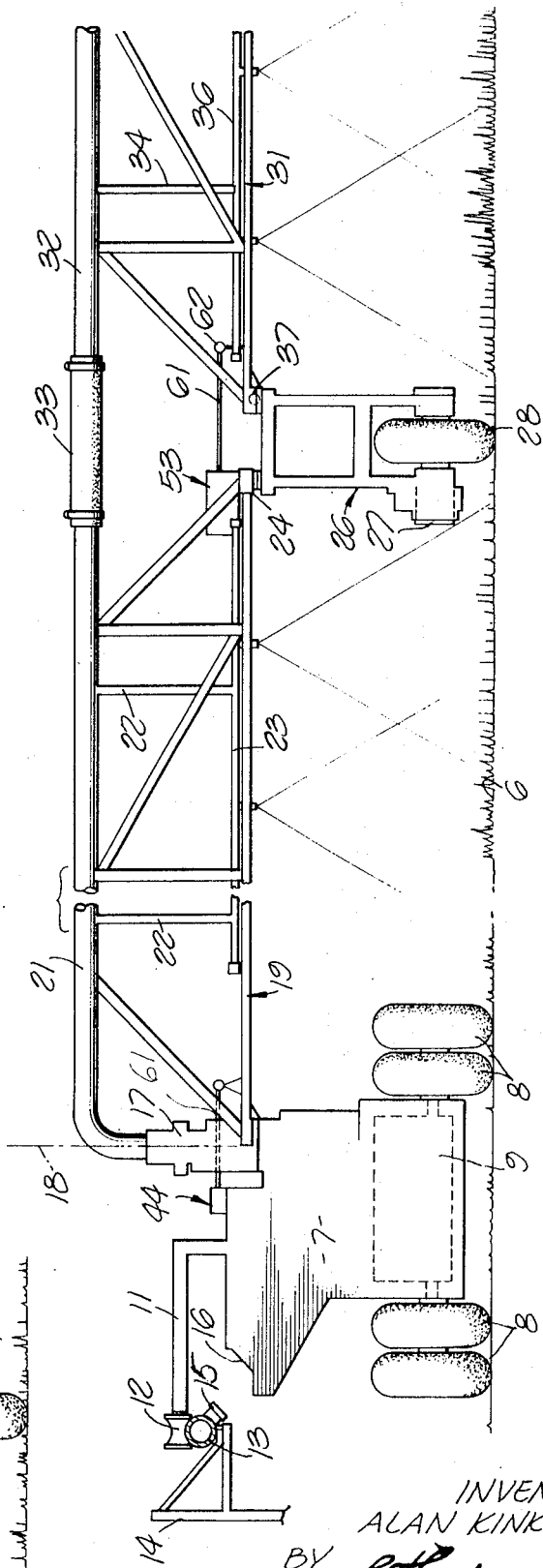
INVENTOR
ALAN KINKEAD
BY Lothrop & West
ATTORNEYS

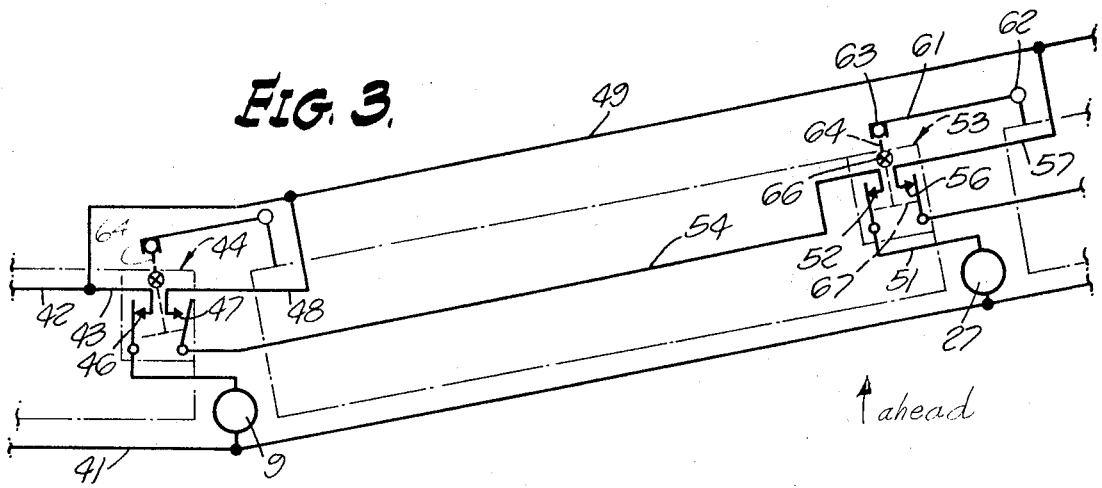
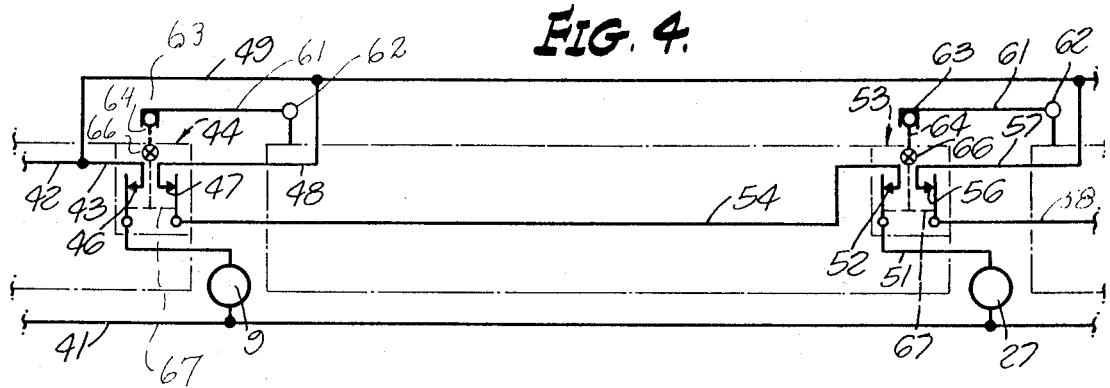
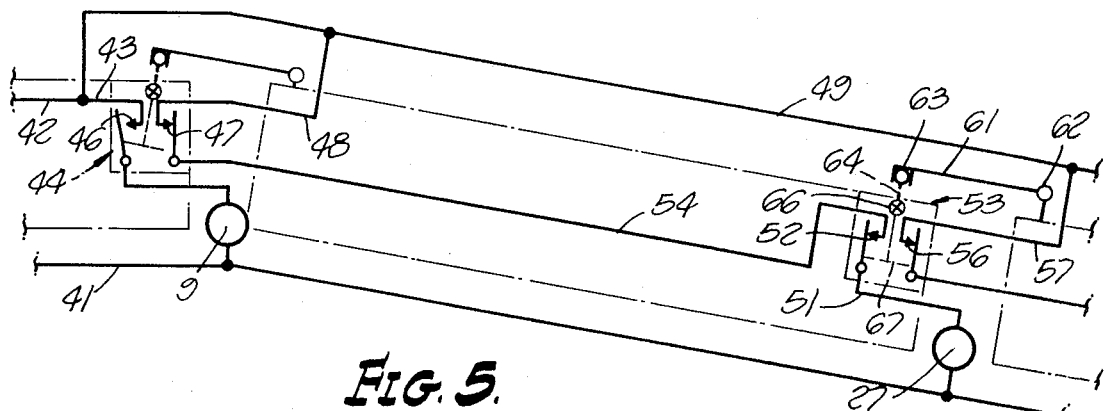

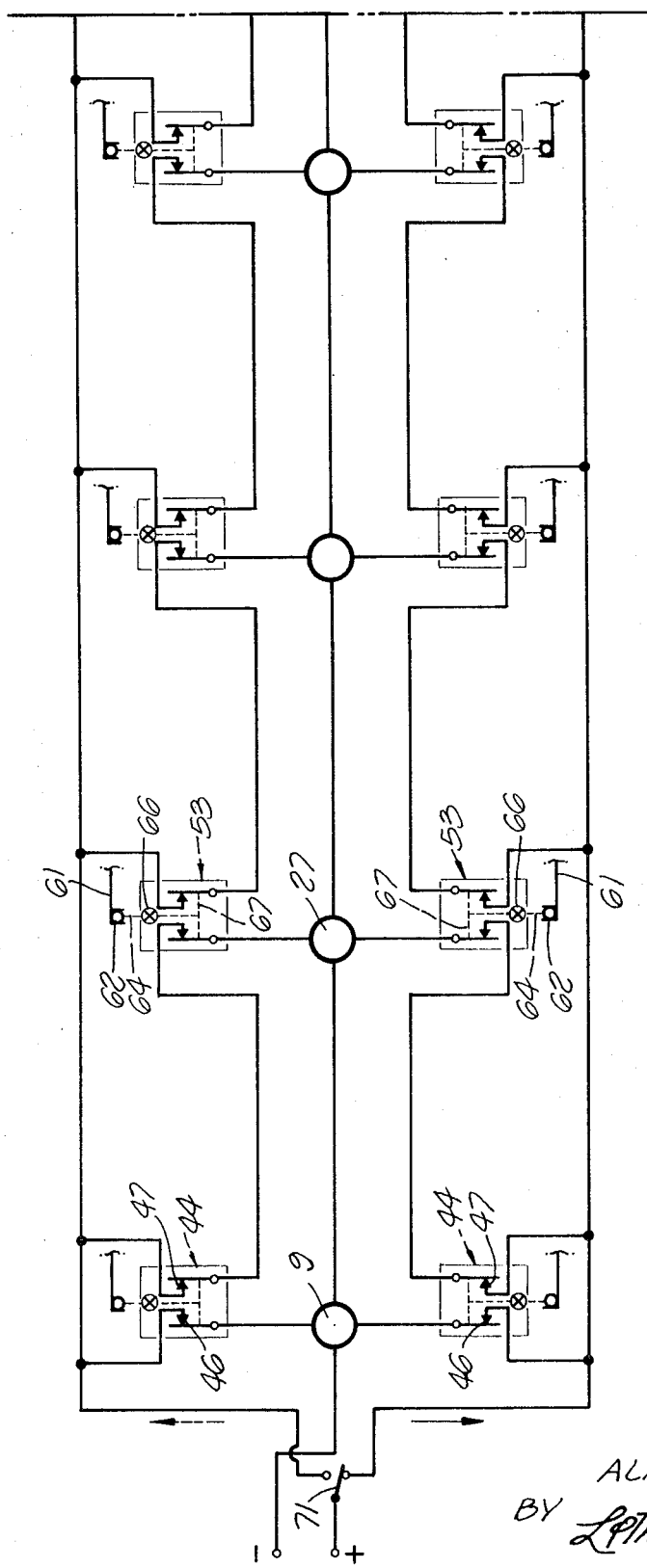

IRRIGATING MACHINE

In recent years it has become the custom in many parts of the world to apply irrigation water to fields, either flat or undulatory and hilly, by means of a traveling, substantially horizontal pipeline supported on wheels or the equivalents spaced apart at intervals along the pipeline and advancing along the ground under the force of propelling motors. Water discharge devices release water at appropriate points along the pipeline to cover the subjacent ground. Because of the length of the pipeline, sometimes a quarter of a mile or more, the pipeline is articulated, usually near the wheels, and the individual units including one end unit called the main unit, are able to swing or move with respect to each other. The relative motion is usually pivotal about a vertical axis and since the individual units are individually propelled and may have different driving conditions, there is a problem of maintaining the desired relationship between any one unit and the successive unit. In most cases it is desired to maintain all of the units in a generally straight line whether the machine repeatedly traverses the same area to and fro in a generally rectilinear path or whether one end of the pipeline is rotatably anchored at a central point and revolves as a radius about the point. In addition to the problem of maintaining the configuration of the pipeline and a related problem of controlling loads longitudinally between units when the traverse is on level ground, there are additional problems involved and sometimes different attitudes or configurations are desired when the ground is hilly.

It is therefore an object of my invention to provide a means for controlling the operation of an articulated irrigating machine to insure that the various units maintain the desired position either in alignment rectilinearly or in other configurations or contours.

Another object of the invention is to provide a controlling mechanism for a multiunit irrigating machine so that the machine, without substantial supervision, will traverse the terrain in the desired fashion.

Another object of the invention is to provide a controlling mechanism for a multiunit irrigating machine able to regulate the longitudinal forces between adjacent units.

Another object of the invention is to provide an irrigating machine in which the controlling mechanism is simple, straightforward and effective.

Another objective of the invention is to provide an irrigating machine which is compatible with irrigation equipment presently available and which will produce an improved result.

A further object of the invention is in general to improve irrigating machines.

Other objects of the invention, together with the foregoing, are attained in the embodiments thereof described in the accompanying description and illustrated in the accompanying drawings, in which:

FIG. 1 is a front elevation of an irrigating machine constructed in accordance with the invention, certain portions being broken away to reduce the size of the figure and some portions being shown diagrammatically;

FIG. 2 is a fragmentary plan of the structure illustrated in FIG. 1;

FIG. 3 is a diagram showing in plan one attitude of successive units of an irrigating machine;

FIG. 4 is a similar view to FIG. 3 but showing a different attitude of the successive machine units;

FIG. 5 is a view similar to FIG. 3 but showing a further attitude of the machine units;

FIG. 6 is a diagram showing an arrangement for an irrigating machine designed to operate in opposite directions; and FIG. 7 is a fragmentary elevation similar to FIG. 1 and showing a modified form of the invention.

In one environment, such as a field 6 to be irrigated, it is convenient to provide an irrigating machine including a number of connected individual units. Most of these are identical but one unit at one end may differ. This end unit, at the left of FIG. 1, is arbitrarily referred to as a main unit 7. It is supported on drive wheels 8 arranged to move the unit 7 in a substantially straight path along the field. There is a wheel-driving motor 9 in the unit 7 which is preferably electrically energized. The main unit 7 also includes considerable auxiliary equipment such as a water force pump and related equipment and in one practical embodiment is conveniently guided by a superstructure 11 having a guide roller 12 bearing upon a water supply pipe 13 extending alongside the edge of the field 6. The pipe 13 is supported on a permanent structure 14 for the purpose. A nozzle 15, appropriately controlled, discharges water into a reservoir 16 on the main unit 7 for further distribution. Extending from the main unit 7 is a connector 17 designed to rotate with respect to the main unit 7 about a vertical axis 18. The connector 17 is a part of the truss 19, itself part of an arbitrarily designated first auxiliary unit and typical of the succession of such trusses each part of another auxiliary unit and effective to support its section of a water main 21 interiorly connected at one end to the force pump on the unit 7. The main 21 conveniently acts as one of the truss numbers and carries water for distribution through connector pipes 22 to a distribution manifold 23 supported on the first auxiliary unit.

The first auxiliary truss 19 at its end remote from the main unit 7 is supported by a fixed connection 24 to a drive unit 26 including an auxiliary propelling motor 27 electrically energized and mounted to drive one or more wheels 28 supported on the ground 6.

Since it is desired to extend the water distribution over a long distance, the first auxiliary truss 19 is supplemented by a second auxiliary truss 31 constructed very much like the truss 19 and supporting its own water main section 32 connected to the main 21 by means of a flexible hose 33. The second auxiliary truss 31 also has pipes 34 joined to a manifold 36 equipped to discharge water onto the ground. The second auxiliary truss 31 is connected to the drive unit 26 rigid on the first auxiliary unit by means of a pivot connection 37 which is a least rotatable about a vertical axis. In fact, the pivot connection can be a ball joint having a considerable range of motion. The second auxiliary truss 31 is supported by its own rigidly connected auxiliary drive unit (not shown, but entirely similar to the unit 26). A succession of auxiliary trusses and drive units just like those described is connected together to extend for the desired distance; for example, a quarter of a mile.

When the main and all auxiliary units are initially longitudinally aligned and it is desired to have the main and all auxiliary units continue to travel in a longitudinal straight line, then theoretically the main propelling motor 9 and all of the auxiliary propelling motors 27 should operate to drive the wheels 8 and 28 at the same speed. The initially aligned units would then be expected to continue in aligned condition. In practice such is not the case. Minor differences in local contour in what is normally considered to be a flat and level field are sufficient to disturb the rectilinear arrangement. The ground may vary locally so that one wheel may slip whereas the others have traction. The various wheels are not always of precisely the same diameter. For various and variable reasons including wind gusts, the individual loads on the main and the several auxiliary driving units may not always be the same. The foregoing and other factors all tend toward misalignment of the various units.

To insure that the main and various auxiliary units bear the desired relationship to each other either rectilinearly or in any predetermined pattern, I preferably provide a control mechanism as diagrammatically illustrated in FIGS. 3, 4 and 5 for single direction operation. Unidirectional motion is most often employed when the main end unit 7 or an equivalent arrangement acts as a central pivot and the other, auxiliary units wheel on a radius. The axis represents such a central pivot and the successive auxiliary units, such as 19 and 31, travel in radial alignment about that axis as a principal center.

As particularly shown at the left in FIG. 4, the electric driving motor 9 of the main unit (hydraulic or pneumatic or internal combustion propulsion can be similarly arranged) or the corresponding motor of the drive unit fixed at the end of any auxiliary unit is provided with electricity from a source through one conductor 41 and through another conductor 42. While the conductor 41 is directly joined to the motor 9, the conductor 42 is not directly connected, but rather has a lead 43 extending to a duplex switch 44. Within the duplex switch is one contact pair 46 controlling the lead 43, and another contact pair 47 supplied with electricity by a lead 48 to a bus 49 connected to the conductor 42. The contact pair 46 and 47 are normally closed. When the circuit to the conductors 41 and 42 is complete electricity can flow through and energize the motor 9. When the switch contacts 46 are separated the motor 9 is deenergized. The first auxiliary propelling motor 27 (FIG. 1 and 4) is joined on one side to the conductor 41 and is joined on the other side by a conductor 51 (at the right in FIG. 4) to a contact pair 52 in another duplex switch 53. One of the contact pairs 52 in the switch 53 is supplied with electricity through a lead 54 extending from the contact pair 47 in the duplex switch 44 and in a comparable fashion the other contact pair 56 in the duplex switch 53 has a lead 57 extending to the bus 49. The other side of the contact pair 56, like the contact pair 47, has a lead 58 comparable to the lead 54 extending in a like fashion to the motor, not shown, but duplicating the motor 27 on the next adjacent auxiliary unit. This duplex switch device and similar electrical interconnections extend from each auxiliary unit to the next along the entire length of the irrigating machine.

Pursuant to the invention, means are provided for selectively actuating the various duplex switches. A typical example is the duplex switch and actuator mounted between the units 7 and 19. Preferably the duplex switch 44 is physically disposed on the unit 7 and is connected to the adjacent unit 19 by an operating rod 61 having a ball connection 62 and having, as diagrammatically shown in FIG. 4, a connection 63 to the operating lever 64 of the switch 44. The operating lever 64 has an internal fulcrum 66 and an operating bar 67 adapted to actuate either one or the other but not both of the switch levers carrying the contacts 46 and 47. The switch mounting and the ball connector 62 are substantially at the same level as the connector 17 when seen in elevation as in FIG. 1, but when seen in plan as in FIG. 2 are separated a short distance from the pivot axis 18. Any relative pivotal movement about the substantially vertical axis 18 between the successive units 7 and 17 causes a substantial displacement of the bar 67 within the duplex switch 44, the direction of actuation being in accordance with the direction of the pivotal movement.

With this arrangement, as long as the successive units 7 and 19 are substantially in line, as shown in plan in FIG. 4, if that is the chosen array, the switch lever 64 (at the left in FIG. 4) is in a neutral position and both of the contact pairs 46 and 47 are effective so that the motor 9 and the corresponding motor 27 of the next unit are operated. However, should the outward auxiliary unit 19 travel unduly fast and advance the unit 19 ahead of the inward unit 7, shown in FIG. 3, then the switch lever 64 (at the left in FIGS. 3 and 4) is rocked to the left and mechanically opens switch pair 47 to stop the advanced motor 27. As soon as the trailing unit 7 catches up to the unit 19 and alignment is resumed then the switch contacts 47 are again closed (as illustrated in FIG. 4) and the aligned advance continues.

By the same token, should any outward auxiliary unit 19 lag behind the inward unit such as 7, as shown in FIG. 5, then the appropriate switch contact pair 46 is opened and the motor 9 of the leading unit 7 is stopped until the lagging outboard unit 19 catches up. In this fashion throughout the entire series of units the individual propelling motors continue to drive or are selectively stopped for short intervals so as to maintain the desired alignment. It may be noted, as an example, that the typical motor 27 can be stopped by opening of the switch pair 47 when the unit 19 is leading the next inward unit 7 or may be stopped by the opening of the series contact pair 52 when the next outward unit 31 lags or trails the unit 19.

While the diagrams and description herein refer to stopping of the motors, in some more sophisticated constructions the switch pairs are replaced by motor-speed-varying devices and the controlled motors are simply slowed in most cases although they can be stopped, as before, in extreme cases. Also, in another arrangement, the motors do not normally run a maximum speed but can have their speed increased as well as decreased by the pivot-responsive controls so that the lagging unit can be rapidly advanced into line and, if desired the leading unit can be retarded at the same time until alignment is restored.

In some instances, particularly when a field is traversed with the same speed at both ends instead of by rotation, the units operate in opposite directions during successive time intervals. In that case the mechanisms of the control as shown in FIG. 3, 4 and 5 are duplicated as shown in FIG. 6. There is a master control switch 71 appropriately moved by hand in accordance with the direction of operation intended. That deenergizes one of the duplex switch arrays along one side and energizes the other duplex switch array on the other side. The effective side is always the one in the direction of motion. Thus, the corrections occur just as previously described no matter what the instant direction of advance may be.

In some cases, especially where there is undulatory terrain; that is, hills to climb or valleys or swales to be traversed, it may be desirable to advance or retard certain of the units or it may be desired to have them operate in advanced or retarded positions in order to make up for the terrain undulation. That is to say, if an outward unit is uptilted and has its longitudinal direction extending up a hill, some of the weight of that unit is transferred by compression longitudinally to the adjacent unit below and so on down the line. Comparably, an outward unit extending longitudinally down a hill exerts some tension on the adjacent uphill unit. A similar tension force may arise between units revolving about a central pivot. If such compression or tension forces are considered to be deleterious a correction or compensation can be made. For example, if the uphill end of an uptilted unit is made to lag somewhat then the unit tends to climb the hill at an angle to the general direction of advance. If this angle of lag is properly chosen, the climbing unit exerts a tension force uphill that balances the downhill compression force. Comparably, the downhill end of a unit, if made to lead somewhat, provides an uphill compression force tending to balance the downhill tension due to weight of the unit. Similarly, in rotary or polar operation, the units may be made to lag or lead each other to afford the desired interunit longitudinal compression or tension.

From the foregoing force compensations the load at the articulation between units can be used to provide corresponding lag or lead at the other end of the unit extending uphill or downhill. This load can be measured by a strain gauge (not shown) effective through an amplifier to speed up or slow down the related motor or longitudinal lost motion can be built into the articulation so that gross movement of adjacent units longitudinally toward and away from each other controls the switches for corresponding motor lag or lead. Also, the actual pivotal movement of adjacent units about a horizontal fore and aft axis can be used to control the lag or lead of the units since the angle between units in a vertical, longitudinal plane is an indication of the uphill or downhill slant of the units.

One arrangement of this sort is shown in FIG. 7. This is substantially the same as shown in the other figures except that rather than have the duplex switch mechanism 76 mounted substantially in the horizontal plane of the pivot 77, the switch is mounted at a considerable elevation about the ball joint 77. Thus, when the unit 78 on the right hand of FIG. 7 tends to rise or rotate in a counterclockwise direction, as seen in FIG. 7, with respect to the adjacent unit 79, then the duplex switch 76 is actuated to produce a corresponding lagging effect on the drive motor of the right-hand unit. Conversely, when the auxiliary unit 78 drops or moves clockwise with respect to the unit 79 then the duplex switch 76 is actuated in a different direction and produces the opposite effect. In this way the uphill unit can be made to lag at its uphill end. Similarly, a downhill unit can be made to lead at its downhill end since the movement about a generally horizontal axis through the ball joint 77 correspondingly controls the electrical response and governs the motor action.

The forces between units that control the various unit motors have been particularly described in connection with uphill and downhill compensation by having the units lag or lead each other. The interunit forces can be used similarly to provide comparable compensation even through such forces do not arise from hilly operation. For example, if tension exists between two successive units joined by a slotted connection, the units tend to move apart. Such motion of the slotted connection can control the propelling motor or motors so that the units tend to converge as they advance. They are in effect "steered" toward each other. When they have converged sufficiently, the play in the slotted connection is restored to its former value. By the same token, the separating force has been compensated for. Comparably, if the slotted connection is forced in the compression direction, the unit motor or motors can be controlled to cause the successive units to tend to diverge as they advance. A corresponding separating force then overcomes the compressive force. In this way, the units can be operated so that there are only momentary and small longitudinal forces between them; that is, the units automatically guide themselves so that it is not necessary to have or provide for large force transfers between them.

I claim:

1. An irrigating machine comprising a main unit adapted to travel on the ground, a main propelling motor connected to drive said main unit, an auxiliary unit adapted to travel on the ground, means for connecting said main unit and said auxiliary unit for relative pivotal movement about an axis, an auxiliary propelling motor connected to drive said auxiliary unit, a duplex switch, means for connecting one part of said switch to energize said main propelling motor, means for connecting the other part of said switch for energizing said auxiliary propelling motor, and means responsive to relative pivotal movement of said auxiliary unit relative to said main unit about said axis in one direction for operating said one part to deenergize said main propelling motor and responsive to relative pivotal movement of said auxiliary unit relative to said main unit about said axis in the other direction for operating said other part to deenergize said auxiliary propelling motor.

2. An irrigating machine as in claim 1 in which the body of said switch is mounted on one of said units and in which the moving portion of said switch is mechanically connected to the other of said units.

3. An irrigating machine as in claim 1 in which said propelling motors are electrical and said duplex switch is normally closed and is opened when moved.

4. An irrigating machine as in claim 1 in which a plurality of said auxiliary units are pivoted together for movement about parallel axes, each of said auxiliary units having its auxiliary propelling motor controlled by relative motion between itself and the adjacent auxiliary unit closest to said main unit.

5. An irrigating machine as in claim 1 in which said duplex switches are duplicated one for each direction of advance and in which means are provided for selecting one or the other of said duplex switches.

6. An irrigating machine as in claim 1 in which said axis is vertical.

7. An irrigating machine as in claim 1 in which said axis is horizontal.

8. An irrigating machine as in claim 1 in which said main unit travels on the ground about a fixed central point.

9. An irrigating machine as in claim 1 in which the movement of a selected unit out of substantially level position relative to an adjacent unit controls in a corresponding fashion the effect of the propelling motor on said selected unit.

10. An irrigating machine as in claim 9 in which a selected unit extending downhill from an adjacent unit is advanced relative to said adjacent unit an amount substantially sufficient to compensate for tension between said units due to said downhill position of said selected unit.

11. An irrigating machine as in claim 9 in which a selected unit extending uphill from an adjacent unit is retarded relative to said adjacent unit an amount substantially sufficient to compensate for compression between said units due to said uphill position of said selected unit.

12. An irrigating machine as in claim 1 in which the relative position of a selected unit with respect to an adjacent unit when measured in a vertical plane controls the relative position of said selected unit with respect to said adjacent unit when measured in a horizontal plane.

13. An irrigating machine as in claim 1 in which the angular relationship of a selected unit with respect to an adjacent unit when measured in a vertical plane and in a horizontal plane controls the effect of the propelling motor on said selected unit.

14. An irrigating machine as in claim 1 in which both said main propelling motor and said auxiliary propelling motor are controlled by duplex switches and said switches are actuated to deenergize which ever propelling motor is advanced relative to the other propelling motor.

15. An irrigating machine as in claim 1 in which the movement of a selected unit longitudinally with respect to an adjacent unit controls in a corresponding fashion the effect of the propelling means to produce an opposite longitudinal movement.

16. An irrigating machine as in claim 1 in which a longitudinal force extended between two adjacent units controls in a corresponding fashion the effect of the propelling means to produce an opposite longitudinal force.